United States Patent Office 2,716,645
Patented Aug. 30, 1955

2,716,645

SOLUBLE ESTERS OF YELLOW TRIAZINE VAT DYES

Isaiah Von, Somerville, N. J., assignor to American Cyanamid Company, New York, N. Y., a corporation of Maine No Drawing. Application May 23, 1951, Serial No. 227,929

9 Claims. (Cl. 260—249)

This invention relates to an improved method of producing sulfuric acid half esters of leuco vat dyes of the polyanthraquinonyl amino triazine type.

Methods of vat dyeing with sulfuric acid half esters of leuco vat dyes have achieved large commercial success because of the advantageous dyeing conditions made possible with this type of compound. However, the sulfuric acid half esters of yellow leuco vat dyes have been very unsatisfactory. In the case of bright yellow dyes of the anthraquinone thiazole type, dyeings have very poor fastness properties, and this property is, of course, shared by their sulfuric esters. Attempts have been made to market sulfuric esters of certain anthraquinone-azo dyes, but also in this case the fastness properties are unsatisfactory. Thus, there has been a serious lack of fast yellow vat dyes which can be dyed in the form of their sulfuric acid half esters.

According to the present invention, sulfuric acid half esters of leuco yellow triazine vat dyes have been developed from which fast bright yellow dyeings are possible. The vat dyestuffs themselves have the following formula:

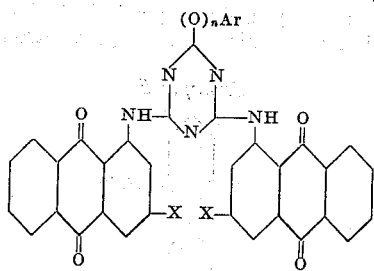

in which $n$ is 0 or 1, X is chlorine or hydrogen, and Ar is an aryl radical. Some of these vat dyes have been known and others are described and claimed in the co-pending application of Gadea and Munro, Serial No. 227,942, filed May 23, 1951, now abandoned. In the past, when it was attempted to prepare sulfuric acid half esters of the leuco forms of the known dyestuffs of the above type, the attempts have failed. Either the esters were not produced at all or they dyed weak and off-shade or were too unstable for practical use.

According to the present invention, it is found that if esters are prepared in which there are substantially four sulfate groups, that is to say, four sulfur atoms for five nitrogen atoms linked to carbon atoms of the triazine ring, the products have adequate stability and dye strong, fast, even shades. It is not necessary that the exact theoretical ratio of sulfur atoms to nitrogen atoms of 0.8 obtain. A little lower ratio still gives satisfactory results but if it drops below 0.7 the product is not practically valuable as it begins to show weakness in dyeing and the shade is no longer true. The sulfuric acid half esters of the present invention may therefore be represented by the following formula:

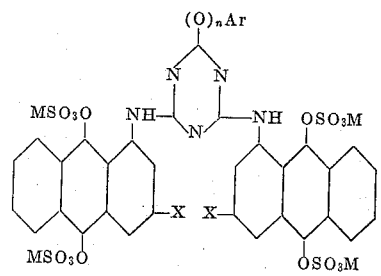

M standing for a cation and the other symbols having the same meaning as in the first formula given. The cation M may be hydrogen, an alkali metal such as Li, Na or K, or ammonium. It is also possible to employ the salts of certain organic bases, such as the ethanolamine, if greater solubility is desired. Usually the alkali metal cations grant sufficient solubility for most practical uses, and thus are preferred for reasons of economy. The nature of the cation M normally does not affect the shade of the dye as the cation together with the whole sulfate radical is split off during the dyeing process.

The present invention includes both the new sulfuric half esters as new chemical compounds and also a new process which so far as we now know is the only practical method by which the new compounds can be produced. Therefore, in a more specific modification the invention includes a new process of making the tetrasulfuric half esters.

The process preferred in the present invention is an anhydrous one using iron as a reducing agent in conjunction with the sulfur trioxide addition product of alpha-picoline. While the operation conditions are not critical and ordinary temperatures such as 30–40° C. can be used, the process is limited to the use of iron and alpha-picoline. When the next lower homolog, pyridine, is employed, the results are practically useless. It is not known why the sulfur trioxide addition product of alpha-picoline has the peculiar property of producing tetrasulfuric esters having a sulfur atom to a nitrogen atom of at least 0.7 and usually approaching 0.8. It is not intended, therefore, to limit the present invention to any theory.

Dyeing with the tetrasulfuric half esters of the present invention is effected by standard dyeing techniques used with sulfuric half esters of leuco dyes and it is an important practical advantage of the present invention that no new techniques are required in dyeing and no critical dyeig problems are presented.

The aryl radical attached to the triazine ring may contain 1 or 2,6-membered carbocyclic rings. Typical examples are phenyl, o- and p-tolyl, o-chlorophenyl, m-chlorophenyl, o-methoxyphenyl, o-hydroxyphenyl, p-phenylphenyl, p-ethylphenyl, p-bromophenyl, alpha-naphthyl, beta-naphthyl, and the like. The anthraquinone radicals may be unsubstituted anthraquinone or 3-chloroanthraquinone.

The invention will be described in greater detail in conjunction with the following specific examples in which the parts are by weight unless otherwise indicated.

*Example 1*

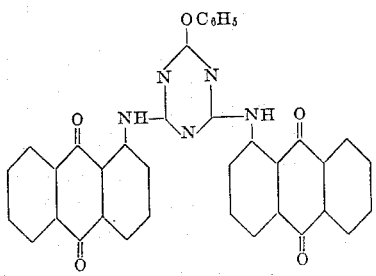

To 130 parts of alpha-picoline is gradually added, at a temperature of 10–15° C., 17.7 parts of chlorosulfonic acid. The mixture is maintained under nitrogen while there is added 10.0 parts of the yellow dyestuff of the above formula. This is followed by the gradual addition of 7.2 parts of powdered iron. During this procedure the temperature is between 29 and 34° C. The reaction mixture is then stirred for three hours at 40° C. and finally at room temperature overnight. The resulting dark brown mixture is drowned in a solution of 55 parts of sodium carbonate in 600 parts of water and freed of picoline by vacuum distillation. The residue is heated, filtered, and vacuum concentrated to the volume of about 330 parts of water. The product is salted out at 10° C. by the addition of 82.5 parts of potassium chloride, then being filtered and washed with potassium chloride-potassium carbonate solution. An excellent yield is obtained, with a sulfur nitrogen ratio of .78; the product gives brilliant yellow dyeings.

*Example 2*

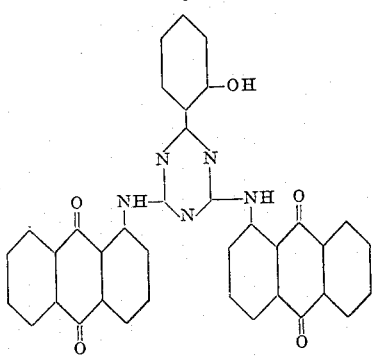

Ten parts of the yellow vat dye of the above formula is added at a temperature of about 15° C. to a mixture of 17.7 parts of chlorosulfonic acid and 114 parts of alpha-picoline, the system then being swept out with nitrogen. There is then added, by portions, at a temperature of 25° C., 7.2 parts of iron powder. The resulting mixture is then stirred for 22 hours at approximately 25–30° C. The resulting brown mixture is drowned in 600 parts of water containing 55 parts of sodium carbonate, and vacuum distilled to remove the picoline. The remaining greenish mixture is heated to 85° C., filtered, concentrated in vacuo to 260 parts by volume, cooled to 10° C., and salted with 65 parts of potassium chloride. The yellow product is filtered, washed with potassium chloride-potassium carbonate solution, and dried in vacuo. An excellent yield is obtained, with a sulfur-nitrogen ratio of .79; it gives bright greenish-yellow dyeings.

*Example 3*

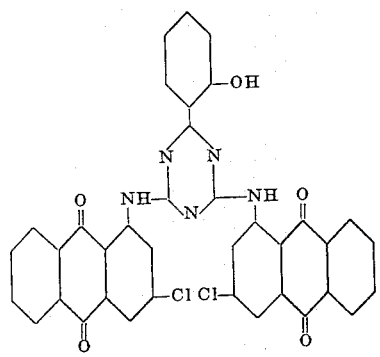

To a mixture of 3.0 parts of the yellow vat dye of the above formula and 34 parts of alpha-picoline, there is gradually added 5.3 parts of chlorsulfonic acid at a temperature below 15° C. The air in the reaction vessel is then swept out with nitrogen, and the mixture gradually treated with 2.2 parts of powdered iron. By means of cooling, the temperature is kept around 30° C. After 24 hours the dark brown reaction mass is drowned in a solution of 16.5 parts of sodium carbonate in 180 parts of water, and vacuum distilled to remove picoline. The residue is filtered, concentrated in vacuo, salted with potassium chloride, cooled to 5° C., and filtered. The product is washed with potassium carbonate solution and dried. A good yield of greenish-yellow indigosol is obtained, with a sulfur-nitrogen ratio of .76.

*Example 4*

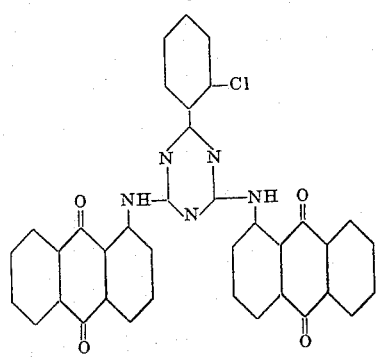

Two parts of the yellow vat dye of the above formula is reduced by the procedure described in the preceding example. The dark brown reaction mixture is worked up in the same way, giving a good yield of the orange yellow indigosol. This product gives strong yellow dyeings.

*Example 5*

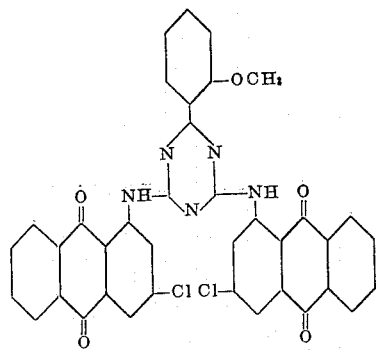

To 34 parts of alpha-picoline is gradually added 5.2 parts of chlorosulfonic acid at a temperature below 15° C. The mixture is maintained under nitrogen while there is added 3.0 parts of the dyestuff of the above formula. There is then added in portions at a temperature of about 28° C., 2.2 parts of powdered iron. During this operation the reaction mixture changes in color from dark brown to dark green. The reaction is completed by stirring for about 24 hours and the mixture is then downed in a solution of 16.5 parts of sodium carbonate in 180 parts of water. The picoline is removed by vacuum distillation and the residue concentrated by evaporation in vacuo. By the addition of potassium chloride, the product is salted out as a yellow precipitate, which is washed with a solution of potassium chloride and potassium carbonate, and dried. A good yield is obtained.

*Example 6*

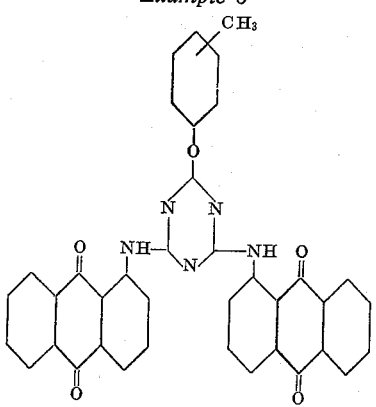

The yellow vat dye of the above formula is reduced and esterified by the procedure of the preceding example. During the treatment with the iron powder, the color of the mixture changes from orange-yellow to dark greenish-brown. The yellow product is isolated in good yield in the ordinary way as described.

*Example 7*

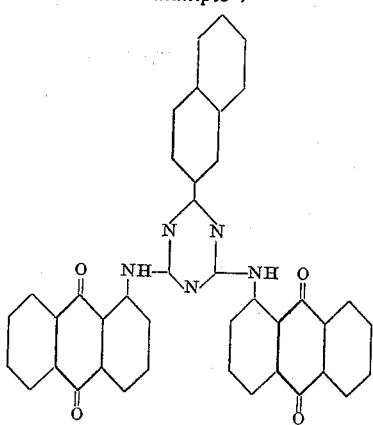

The procedure of Example 5 is applied to 1.3 parts of the dyestuff of the above formula. The greenish-yellow product is isolated in good yield.

I claim:

1. A soluble sulfuric ester of a leuco vat dyestuff of the formula

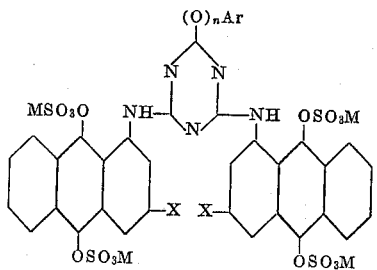

in which M is a cation, n is a number selected from the group consisting of 0 and 1, X is selected from the group consisting of H and Cl, and Ar is an aryl radical of the benzene and naphthalene series, said sulfuric ester being characterized by an atomic ratio of sulfur to nitrogen linked to carbons of the triazine ring of at least 0.7.

2. A soluble sulfuric ester according to claim 1 in which the cation is an alkali metal.

3. A soluble sulfuric ester of a leuco vat dyestuff of the formula

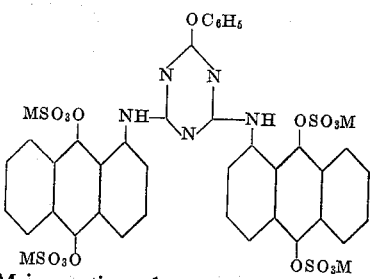

in which M is a cation, characterized by an atomic ratio of sulfur to nitrogen linked to carbons of the triazine ring of at least 0.7.

4. A soluble sulfuric ester of a leuco vat dyestuff of the formula

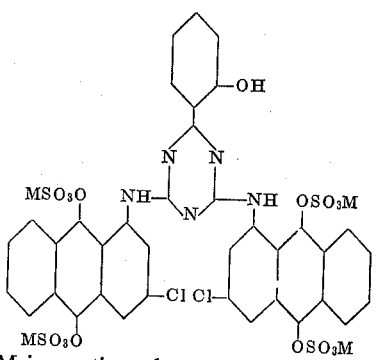

in which M is a cation, characterized by an atomic ratio of sulfuric to nitrogen linked to carbons of the triazine ring of at least 0.7.

5. A soluble sulfuric ester of a leuco vat dyestuff of the formula

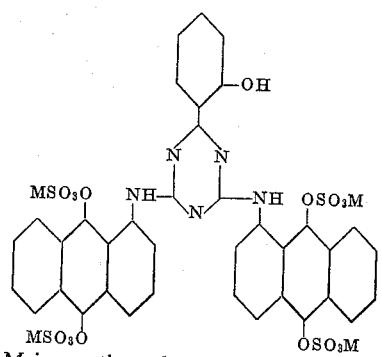

in which M is a cation, characterized by an atomic ratio of sulfur to nitrogen linked to carbons of the triazine ring of at least 0.7.

6. A soluble sulfuric ester of a leuco vat dyestuff of the formula

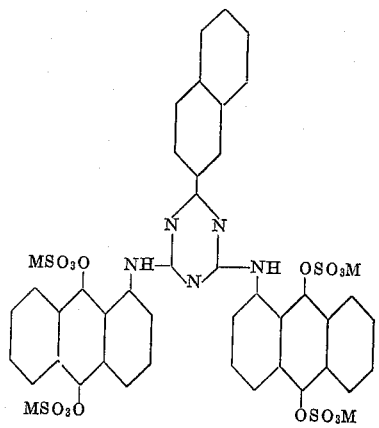

in which M is a cation, characterized by an atomic ratio of sulfur to nitrogen linked to carbons of the triazine ring of at least 0.7.

7. A process of producing a tetrasulfuric half ester of a leuco vat dyestuff having the following formula

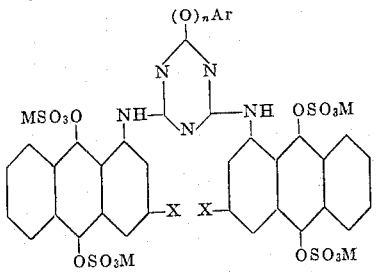

in which M is a cation, $n$ is a number selected from the group consisting of 0 and 1, X is selected from the group consisting of H and Cl, and Ar is an aryl radical of the benzene and naphthalene series, which comprises reacting the corresponding vat dyestuff with sufficient iron and sulfur trioxide addition product of alpha-picoline to reduce the four quinone groups and to supply four equivalents of $SO_3$, said reactions being effected in an anhydrous reaction medium.

8. The method of claim 7 in which the original vat dyestuff employed therein is a vat dyestuff having the formula

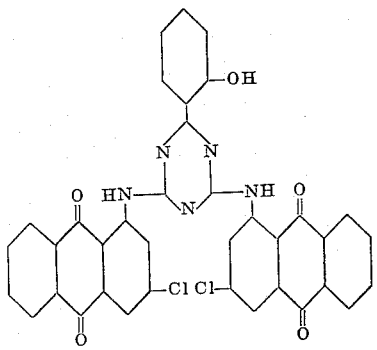

the soluble sulfuric half ester of the leuco vat dyestuff so obtained being characterized by an atomic ratio of sulfur to nitrogen linked to carbons of the triazine ring of at least 0.7.

9. The method of claim 7 in which the original vat dye employed therein is a 2-aryl-4:6(di-anthraquinonyl-amino)-1,3,5-triazine vat dyestuff having the formula

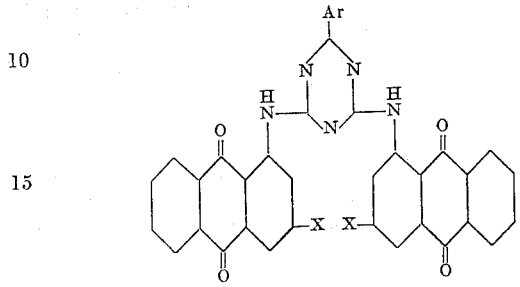

wherein X is selected from the group consisting of H and Cl and Ar is an aryl radical of the benzene and naphthalene series, the soluble sulfuric half ester of the leuco vat dyestuff so obtained being characterized by an atomic ratio of sulfur to nitrogen linked to carbon atoms of the triazine ring of at least 0.7.

References Cited in the file of this patent

UNITED STATES PATENTS

| | | |
|---|---|---|
| 1,663,474 | Ackerman | Mar. 20, 1928 |
| 1,867,125 | Weiners | July 12, 1932 |
| 1,994,602 | Weiners | Mar. 19, 1935 |
| 2,403,226 | Lecher | July 2, 1946 |

FOREIGN PATENTS

| | | |
|---|---|---|
| 449,477 | Great Britain | of 1936 |
| 796,539 | France | of 1936 |

OTHER REFERENCES

Diserens: "The Chemical Technology of Dyeing and Printing," pp. 175–181.